(12) United States Patent
Berkemeier et al.

(10) Patent No.: US 10,077,750 B2
(45) Date of Patent: Sep. 18, 2018

(54) METHOD FOR OPERATING A DIRECT-INJECTION INTERNAL COMBUSTION ENGINE, AND APPLIED-IGNITION INTERNAL COMBUSTION ENGINE FOR CARRYING OUT SUCH A METHOD

(71) Applicant: Ford Global Technologies, LLC, Dearborn, MI (US)

(72) Inventors: Oliver Berkemeier, Bergisch Gladbach (DE); Klemens Grieser, Langenfeld (DE); Jan Linsel, Cologne (DE); Kay Hohenboeken, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/411,256

(22) Filed: Jan. 20, 2017

(65) Prior Publication Data
US 2017/0204827 A1    Jul. 20, 2017

(30) Foreign Application Priority Data
Jan. 20, 2016   (DE) .................. 10 2016 200 700

(51) Int. Cl.
*F02M 61/18*   (2006.01)
*F02M 61/10*   (2006.01)
(Continued)

(52) U.S. Cl.
CPC ....... *F02M 61/1853* (2013.01); *F02B 17/005* (2013.01); *F02M 61/10* (2013.01); *F02M 61/14* (2013.01); *F02M 61/1886* (2013.01)

(58) Field of Classification Search
CPC .... F02M 61/1853; F02M 61/10; F02M 61/14; F02M 61/1886; F02B 17/005
(Continued)

(56) References Cited

U.S. PATENT DOCUMENTS

| 4,273,291 A | * | 6/1981 | Muller .................. F02M 61/06 |
| | | | 239/533.12 |
| 5,044,562 A | | 9/1991 | Rogers et al. |

(Continued)

FOREIGN PATENT DOCUMENTS

| DE | 19945813 A1 | 3/2001 |
| DE | 10117519 A1 | 10/2002 |

(Continued)

OTHER PUBLICATIONS

ISA Korean Intellectual Property Office, International Search Report and Written Opinion Issued in Application No. PCT/US2017/014339, dated May 22, 2017, WIPO, 13 pages.

*Primary Examiner* — Mahmoud Gimie
(74) *Attorney, Agent, or Firm* — Julia Voutyras; McCoy Russell LLP

(57) ABSTRACT

Systems and methods are provided for operation of fuel injectors within an applied-ignition, direct-injection internal combustion engine. In one example, a needle of a fuel injector is moved from a retracted position to an extended position relative to a plurality of injection holes of a nozzle of the fuel injector, with at least one injection hole being separated from a fuel supply system earlier than each other injection hole. In a partially retracted position, fuel flow along a first side of the needle is decreased relative to fuel flow along a second side of the needle.

18 Claims, 4 Drawing Sheets

(51) Int. Cl.
*F02B 17/00* (2006.01)
*F02M 61/14* (2006.01)

(58) Field of Classification Search
USPC .............. 123/294; 239/533.3, 533.4, 533.12
See application file for complete search history.

(56) References Cited

U.S. PATENT DOCUMENTS

| | | |
|---|---|---|
| 5,890,660 A | 4/1999 | Stevens |
| 6,257,506 B1 * | 7/2001 | Hofmann ............... F02M 45/00 |
| | | 239/533.12 |
| 6,382,533 B1 | 5/2002 | Mueller et al. |
| 6,546,914 B1 | 4/2003 | Fath et al. |
| 7,871,021 B2 * | 1/2011 | Cooke .................. F02M 45/086 |
| | | 239/102.2 |
| 8,302,889 B2 | 11/2012 | Hashii et al. |

FOREIGN PATENT DOCUMENTS

| | | |
|---|---|---|
| DE | 602005005981 T2 | 5/2009 |
| EP | 0637686 A1 | 2/1995 |
| EP | 0718492 A1 | 6/1996 |
| EP | 0867611 B1 | 12/1999 |
| EP | 1404955 B1 | 5/2005 |
| EP | 2108810 A2 | 10/2009 |
| JP | H10331739 A | 12/1998 |
| JP | 2000205088 A * | 7/2000 |
| WO | 2004053326 A1 | 6/2004 |

* cited by examiner

METHOD FOR OPERATING A DIRECT-INJECTION INTERNAL COMBUSTION ENGINE, AND APPLIED-IGNITION INTERNAL COMBUSTION ENGINE FOR CARRYING OUT SUCH A METHOD

CROSS REFERENCE TO RELATED APPLICATION

The present application claims priority to German Patent Application No. 102016200700.9, filed on Jan. 20, 2016. The entire contents of the above-referenced application are hereby incorporated by reference in its entirety for all purposes.

FIELD

The present description relates generally to methods and systems for controlling direct fuel injection in an internal combustion engine of a vehicle.

BACKGROUND/SUMMARY

With the direct injection of the fuel into a combustion chamber of an internal combustion engine, it is possible in particular to realize a stratified combustion chamber charge. This can contribute significantly to the dethrottling of the Otto-cycle working process because the internal combustion engine can be leaned to a very great extent by means of the stratified charge operation, which offers thermodynamic advantages in particular in part-load operation (in the lower and middle load range, when small amounts of fuel are to be injected).

However, in the case of the direct injection of fuel into internal combustion engines, problems may be caused by the coking of the injection device, for example of an injection nozzle which is used for the injection. Here, extremely small quantities of fuel which adhere to the injection device during the injection undergo incomplete combustion under oxygen-deficient conditions. Deposits of coking residues form on the injection device. Said coking residues may firstly disadvantageously change the geometry of the injection device and influence or hinder the formation of the injection jet, and thereby sensitively disrupt mixture preparation. Secondly, injected fuel accumulates in the porous coking residues, which fuel, often toward the end of the combustion when the oxygen provided for the combustion has been almost completely consumed, then undergoes incomplete combustion and forms soot, which in turn contributes to the increase in particle emissions. Furthermore, coking residues may become detached for example as a result of mechanical loading caused by a pressure wave propagating in the combustion chamber or the action of the injection jet. The residues detached in this way may lead to damage in the exhaust-gas discharge system, and for example impair the functional capability of exhaust-gas aftertreatment systems provided in the exhaust-gas discharge system.

Attempts to address the build-up of coking residues and/or deplete deposits of coking residues (e.g., remove said coking residues) include measures described by German laid-open specification DE 199 45 813 A1, European patent EP 1 404 955 B1, and German laid-open specification DE 101 17 519 A1, for example.

The German laid-open specification DE 199 45 813 A1 describes a method for operating a direct-injection internal combustion engine, in which method, upon the detection of deposits in the combustion chamber, for example on an injection valve, measures are implemented in a targeted manner for cleaning the combustion chamber, wherein the presence of deposits in the combustion chamber is inferred from a misfire detection system. Measures proposed for cleaning the combustion chamber include the targeted initiation of knocking combustion and/or the introduction of a cleaning fluid into the intake combustion air. Both measures must be regarded as critical with regard to fuel consumption and pollutant emissions. Proposed as a particularly advantageous cleaning fluid is water, the injection of which causes the combustion temperature to be lowered, as a result of which the emissions of nitrogen oxides ($NO_x$) can be simultaneously reduced. The injection of water is however not suitable in part-load operation at low loads and low rotational speeds, because this harbors the risk of corrosion in the combustion chamber and in the exhaust-gas discharge system, and can yield disadvantages in terms of wear.

The European patent EP 1 404 955 B1 describes an internal combustion engine whose at least one combustion chamber has, at least in regions, a catalytic coating on the surface for the purpose of oxidation of coking residues. The catalytic layer is intended to promote the oxidation of coking residues, specifically to effect a fast oxidation of the carbon-containing lining at a boundary surface between the catalytic converter and lining at typical operating temperatures, and to thereby effect an early detachment of the deposit under the action of the prevailing flow. In this way, it is sought to reduce or even completely prevent growth of the residues. A disadvantage of the method described in EP 1 404 955 B1 for the reduction of coking residues by means of oxidation is that, even when using catalytic materials, the minimum temperatures required for the oxidation are not always reached in part-load operation at low loads and low rotational speeds. It is however precisely these operating conditions of the internal combustion engine, specifically low loads and/or low rotational speeds, that promote, that is to say expedite, the formation of deposits of the type in question, and that necessitate a method for removing said deposits.

The German laid-open specification DE 101 17 519 A1 describes a method for operating a direct-injection internal combustion engine in which the inlet valve unit of a cylinder is purposely equipped with a means which prevents the dissipation of heat, that is to say is designed to increase the surface temperature in the region of the throat of the inlet valve. It is thereby sought to ensure that, at least in the throat, the high temperatures required for the depletion of coking residues are attained more often, or regularly, during normal operation of the internal combustion engine. Nevertheless, that region in the load-engine speed characteristic map in which the required temperatures are actually reached is merely widened, that is to say enlarged. The region in which the minimum temperatures of 380° C. required for the depletion of coking residues prevail lies close or adjacent to the full-load line at high engine speeds and high loads. Method-based measures for targetedly increasing the component temperature in other characteristic map regions are not implemented in DE 101 17 519 A1. Rather, it is relied upon that the required temperatures are generated of their own accord during normal operation of the internal combustion engine in corresponding regions of the load-engine speed characteristic map. In this respect, the method of DE 101 17 519 A1 also does not permit the depletion of coking residues, that is to say cleaning by means of oxidation, at low loads and low engine speeds of the internal combustion engine.

The above-described problem takes on an even greater significance during the warm-up phase of the internal combustion engine, in particular directly after a cold start of the internal combustion engine, when the component temperatures are particularly low. This is because the low temperature level not only expedites the formation of coking residues but also makes the removal of said residues more difficult.

In one example, the issues described above may be addressed by a method for operating an applied-ignition, direct-injection internal combustion engine having at least one cylinder, in which each cylinder is, for the direct introduction of fuel into the cylinder, equipped with an injection device which has a movable closure body, the method comprising: by positive control, during the course of an injection, connecting at least two openings provided in a housing of the injection device to a fuel supply system for the purposes of introducing fuel into the cylinder, and thus opening up the at least two openings by moving the movable closure body from a rest position in which the at least two openings are separated and blocked from the fuel supply system to a working position connecting the at least two openings to the fuel supply system; and proceeding from the working position in which the at least two openings are connected to the fuel supply system, moving the closure body from the working position into the rest position, with the at least two openings of the injection device being separated from the fuel supply system in succession with a time offset in such a way that at least one opening of the at least two openings is already fully separated from the fuel supply system while at least one other opening of the at least two openings is still connected to the fuel supply system. In this way, a likelihood of fuel deposits forming on a tip of the injection device may be reduced, and particle emissions from the engine may be decreased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
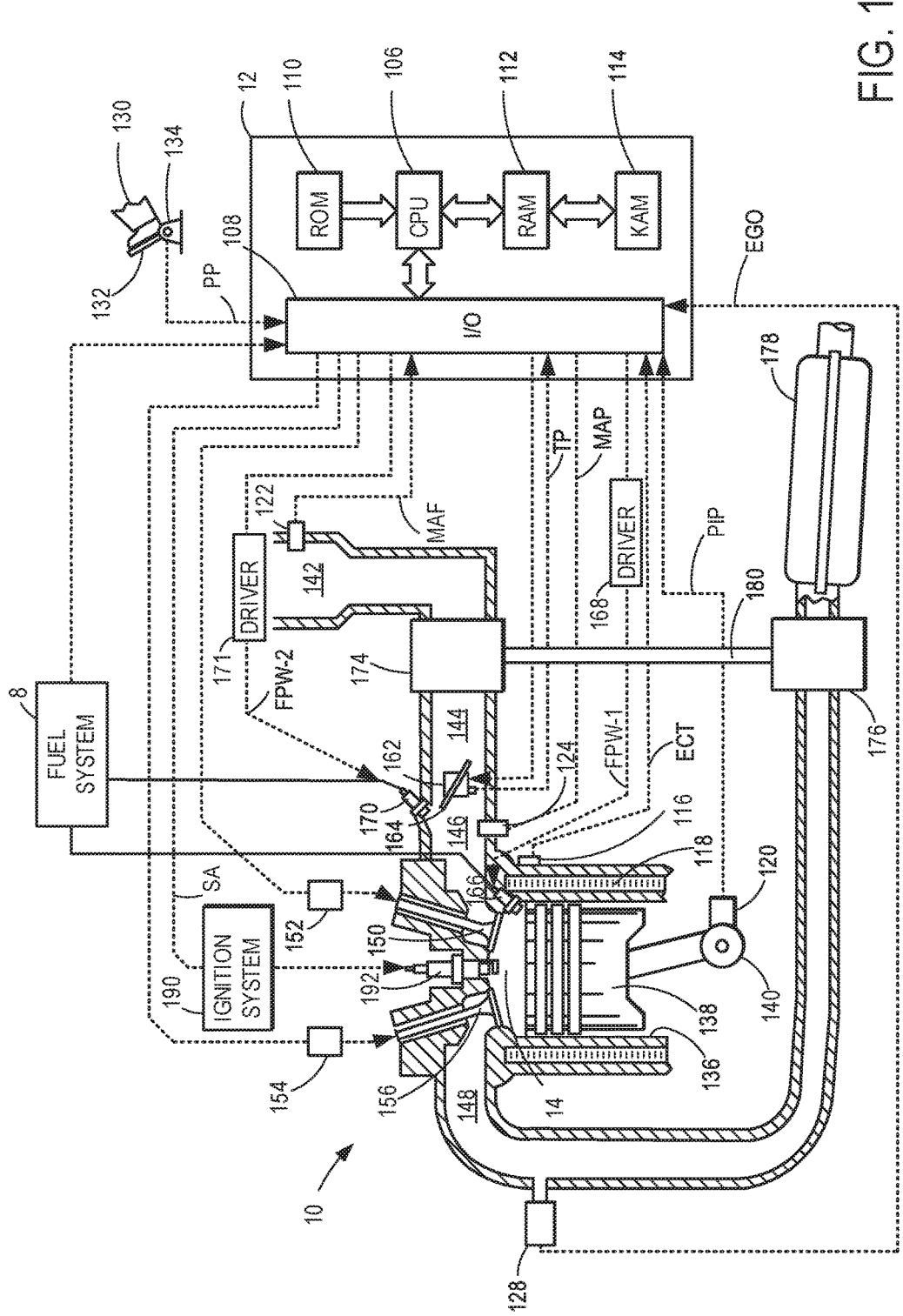
FIG. 1 schematically shows a cylinder of an engine coupled to a fuel injector for direct fuel injection.

The present disclosure relates to a method for operating an applied-ignition, direct-injection internal combustion engine having at least one cylinder, in which each cylinder is, for the direct introduction of fuel into the cylinder, equipped with an injection device which has a movable closure body, the method comprising: by positive control, during the course of an injection, connecting at least two openings provided in a housing of the injection device to a fuel supply system for the purposes of introducing fuel into the cylinder, and thus opening up the at least two openings by moving the movable closure body from a rest position in which the at least two openings are separated and blocked from the fuel supply system to a working position connecting the at least two openings to the fuel supply system; and proceeding from the working position in which the at least two openings are connected to the fuel supply system, moving the closure body from the working position into the rest position, with the at least two openings of the injection device being separated from the fuel supply system in succession with a time offset in such a way that at least one opening of the at least two openings is already fully separated from the fuel supply system while at least one other opening of the at least two openings is still connected to the fuel supply system.

An internal combustion engine of the stated type is used as a motor vehicle drive unit. Within the context of the present disclosure, the expression "internal combustion engine" encompasses applied-ignition Otto-cycle engines but also hybrid internal combustion engines, that is to say applied-ignition internal combustion engines that are operated using a hybrid combustion process, and hybrid drives which comprise not only the applied-ignition internal combustion engine but also an electric machine which can be connected in terms of drive to the internal combustion engine and which receives power from the internal combustion engine or which, as a switchable auxiliary drive, additionally outputs power.

In the development of internal combustion engines, it is constantly sought to minimize fuel consumption and reduce pollutant emissions. Fuel consumption poses a problem in particular in the case of applied-ignition Otto-cycle engines. The reason for this lies in the principle of the working process of the traditional Otto-cycle engine which is operated with a homogeneous fuel-air mixture, in which the desired power is set by varying the charge of the combustion chamber, that is to say by means of quantity regulation. By adjusting a throttle flap which is provided in the intake tract, the pressure of the inducted air downstream of the throttle flap can be reduced to a greater or lesser extent. For a constant combustion chamber volume, it is possible in this way for the air mass, that is to say the quantity, to be set by means of the pressure of the inducted air. However, quantity regulation by means of a throttle flap has thermodynamic disadvantages in the part-load range owing to the throttling losses.

One approach for dethrottling the Otto-cycle engine working process consists in the development of hybrid combustion processes, and is based on the transfer of technical features of the traditional diesel engine process, which is characterized by air compression, a non-homogeneous mixture, auto-ignition and quality regulation. The low fuel consumption of diesel engines results inter alia from the quality regulation, wherein the load is controlled by means of the fuel quantity injected.

The injection of fuel directly into the combustion chamber of the cylinder is considered to be a suitable measure for dethrottling the Otto-cycle working process, by way of which fuel consumption can be noticeably reduced even in Otto-cycle engines. In certain operating ranges, quality regulation is then used.

The stratified charge is distinguished by a highly non-homogeneous combustion chamber charge which cannot be characterized by a uniform air ratio but which has both lean ($\lambda>1$) mixture parts and also rich ($\lambda<1$) mixture parts, wherein an ignitable fuel-air mixture with a relatively high fuel concentration is present in the region of the ignition device.

An applied-ignition direct-injection internal combustion engine is also the subject matter of the present disclosure.

A relatively small amount of time is available for the injection of the fuel, for the mixture preparation in the combustion chamber, that is to say the mixing of air and fuel and the preparation including evaporation, and for the ignition of the prepared mixture.

Since only a small amount of time is available for the preparation of an ignitable and combustible fuel-air mixture as a result of the direct injection of the fuel into the combustion chamber, direct-injection processes are significantly more sensitive to changes and deviations in the mixture formation, in particular in the injection, than conventional processes with intake pipe injection.

The non-homogeneity of the fuel-air mixture is also a reason why the particle emissions known from the diesel engine process are likewise of relevance in the case of the direct-injection applied-ignition engine, whereas said emissions are of almost no significance in the case of the traditional Otto engine.

Against the background of that stated above, it is an object of the present disclosure to specify a method for operating an applied-ignition, direct-injection internal combustion engine according to the preamble of claim 1, by means of which the build-up of cooking residues on the injection device is counteracted in an effective and targeted manner.

It is a further sub-object of the present disclosure to specify an applied-ignition internal combustion engine for carrying out a method of said type.

The first sub-object is achieved by way of a method for operating an applied-ignition, direct-injection internal combustion engine having at least one cylinder, in which each cylinder is, for the direct introduction of fuel into the cylinder, equipped with an injection device which has a movable closure body which, by positive control, during the course of an injection, connects at least two openings provided in a housing of the injection device to a fuel supply system for the purposes of introducing fuel into the cylinder, and thus opens up said openings, the movable closure body, in a rest position, separating the at least two openings from the fuel supply system and thus blocking said openings, and in a working position, connecting the at least two openings to the fuel supply system, which internal combustion engine is distinguished by the fact that, proceeding from a working position in which the at least two openings are connected to the fuel supply system, the closure body is moved into the rest position, at least two openings of the injection device being separated from the fuel supply system in succession with a time offset, in such a way that at least one opening is already fully separated from the fuel supply system while at least one other opening is still connected to the fuel supply system.

In the method according to the present disclosure, the build-up of cooking residues is counteracted a priori. By way of the manner in which the injection is performed according to the present disclosure, that is to say the configuration according to the present disclosure of the injection process, cooking residues are eliminated or considerably reduced from the outset.

According to the present disclosure, the injection process, that is to say the introduction of fuel into the cylinders, is ended by virtue of the openings of the injection device being separated from the fuel supply system not simultaneously but with a time offset. As a result of the separation from the fuel supply system, the openings are deactivated, that is to say blocked, and shut off with regard to the introduction fuel. According to the present disclosure, at least two openings of the injection device are deactivated not simultaneously but in succession.

This approach has the technical effect that, during the injection, it is no longer the case that fuel adheres to the injection device, and the quantity of fuel that adheres to the injection device at the combustion chamber side toward the end of the injection is substantially minimized. In this respect, the basis for the formation of coking residues based on an incomplete combustion of precisely these leftover fuel quantities is eliminated, that is to say the prerequisites for such formation are eliminated.

The physical relationships on which the above-described effect of the method according to the present disclosure is based can be explained on the basis of a conventional, inwardly opening injection nozzle in the case of which a nozzle needle is, toward the end of the injection, moved into the rest position in which the needle separates a blind hole, arranged on the combustion-chamber-side end of the nozzle, from the fuel supply system. The pressure of the fuel situated in the blind hole toward the end of the injection is dissipated by the nozzle holes, which are in each case connected via a duct to the blind hole.

Since, in the prior art, all nozzle holes are deactivated simultaneously, the pressure in the blind hole is dissipated preferentially via the nozzle holes, which pose the least resistance to the dissipation of pressure or support said dissipation of pressure. The nozzle holes differ in this regard, wherein the angle $\alpha_{gravity}$ formed between a nozzle hole or the nozzle-specific duct and the gravitational acceleration, that is to say gravity, appears to have a major influence.

The greater the angle $\alpha_{gravity}$ formed between a nozzle hole or the nozzle-specific duct and the gravitational acceleration, the more susceptible the nozzle hole appears to be to the adhesion of fuel toward the end of the injection. The pressure or impulse which is required and also responsible for the discharging of the fuel appears to be less pronounced in the case of a horizontally running nozzle hole than in the case of a nozzle hole which runs more vertically.

In this respect, according to the present disclosure, it is also preferably the case that those openings which exhibit relatively low susceptibility to the adhesion of fuel are separated from the fuel supply system first.

Overall, with the use of the method according to the present disclosure, fewer or no deposits of cooking residues form on the injection device, because an adhesion of fuel to the injection device is prevented, and the fuel is introduced entirely, or virtually without residues, into the combustion chamber of the cylinder.

With the method according to the present disclosure, the first sub-object on which the present disclosure is based is achieved, that is to say a method for operating an applied-ignition, direct-injection internal combustion engine according to the preamble of claim 1 is specified, by means of which the build-up of cooking residues on the injection device is counteracted in an effective and targeted manner.

Embodiments of the method are advantageous in which, proceeding from a working position in which the at least two openings are connected to the fuel supply system, the closure body is moved into the rest position, at least one opening which exhibits relatively high susceptibility to the adhesion of fuel being separated from the fuel supply system later than at least one other opening which exhibits relatively low susceptibility to the adhesion of fuel.

Embodiments of the method are advantageous in which, proceeding from a working position in which the at least two openings are connected to the fuel supply system, the closure body is moved into the rest position, at least one opening which, in the installed position of the internal combustion engine, forms a relatively large angle $\alpha_{gravity}$ with a prevailing gravitational acceleration being separated from the fuel supply system later than at least one other opening which, in the installed position of the internal combustion engine, forms a relatively small angle $\alpha_{gravity}$ with a prevailing gravitational acceleration.

The second sub-object on which the present disclosure is based, specifically that of providing an applied-ignition, direct-injection internal combustion engine for carrying out a method of an above-described type, is achieved by way of an applied-ignition, direct-injection internal combustion engine having at least one cylinder, in which each cylinder is, for the direct introduction of fuel into the cylinder, equipped with an injection device which has a movable closure body which, by positive control (e.g., energization of an actuator of the moveable closure body, such as a solenoid), during the course of an injection, connects at least two openings provided in a housing of the injection device to a fuel supply system for the purposes of introducing fuel into the cylinder, and thus opens up said openings, the movable closure body, in a rest position, separating the at least two openings from the fuel supply system and thus blocking said openings, and in a working position, connecting the at least two openings to the fuel supply system, which internal combustion engine is distinguished by the fact that the closure body can be moved into a working position in which at least one opening is already fully separated from the fuel supply system while at least one other opening is still connected to the fuel supply system.

That which has already been stated with regard to the method according to the present disclosure also applies to the internal combustion engine according to the present disclosure, for which reason reference is generally made at this juncture to the statements made above with regard to the method.

The fuel supply system may comprise a pump, a storage tank, that is to say a fuel store, and/or a fuel line, for example the common supply line of a common-rail system. The fact that the present disclosure is directed to the separation from the fuel supply system is based on the fact that, for the ending of the injection process, the openings are generally not closed in the true sense but are often merely separated from the fuel supply.

The closure body, for example the spherical tip of a nozzle needle, may be actuated, that is to say moved, and transferred from one position into another position, electromagnetically, piezoelectrically or in some other way, wherein the closure body can generally assume multiple working positions.

The blocking of at least two openings of the injection device with a time offset, according to the present disclosure, requires an arrangement of the openings or of at least one opening which is changed in relation to the prior art, a different shaping of the closure body, and/or a different, for example non-rectilinear displacement travel of the closure body.

Further advantageous embodiments of the internal combustion engine according to the present disclosure will be explained further below.

Embodiments of the internal combustion engine are advantageous in which, in the installed position of the internal combustion engine, at least two openings form a different angle $\alpha_{gravity}$ with a prevailing gravitational acceleration.

In the present case, consideration is given to the installed position of the internal combustion engine, that is to say the internal combustion engine installed or mounted in a vehicle, wherein a horizontal vehicle oriented perpendicular to gravitational acceleration is assumed.

The action of gravity can counteract or assist in preventing the adhesion of fuel to the opening. In the case of an opening oriented transversely, that is to say so as to be inclined, relative to gravitational acceleration, the action of gravity cannot, in principle, optimally assist the emptying of the opening, such that an opening of said type is more susceptible to the adhesion of fuel than an opening which runs more vertically.

The greater the angle $\alpha_{gravity}$ formed between an opening or the associated duct and the gravitational acceleration, the more susceptible said opening appears to be to the adhesion of fuel. In some examples, embodiments of the internal combustion engine are advantageous in which the injection device has at least five openings, at least six openings, or at least seven openings.

The three above embodiments make allowance for the fact that the number of openings jointly influences the distribution of the introduced fuel in the combustion chamber of the cylinder. The more openings are provided, the more widely the fuel can distribute in the combustion chamber, and the more effectively the fuel-air mixture can homogenize.

Embodiments of the internal combustion engine are advantageous in which the movable closure body is displaceable in translational fashion.

In the case of a conventional, inwardly opening injection nozzle according to the prior art, a nozzle needle is displaced in translational fashion in order to move a spherical closure body, which is arranged on the combustion-chamber-side end of the nozzle needle, from the rest position into a working position. In the working position, the spherical closure body opens up a blind hole and thus connects the ducts, which proceed from the blind hole, of the nozzle holes to the fuel supply system of the internal combustion engine.

To form an injection device according to the present disclosure, it would be necessary, with the use of a closure body which is displaceable in translational fashion, for at least one opening to be arranged differently, and/or for the closure body to have a different shape or design than in the prior art, for example to be flattened on one side.

Embodiments of the internal combustion engine may also be advantageous in which the movable closure body is displaceable along an arcuate curve.

Embodiments of the internal combustion engine may furthermore be advantageous in which the displacement travel of the movable closure body has both a rectilinear component and an arcuate component.

Embodiments of the internal combustion engine are advantageous in which at least one opening is arranged on an outer circumference of the closure body situated in the rest position. Said opening would then preferably constitute an opening which exhibits relatively low susceptibility to the adhesion of fuel and which is separated from the fuel supply system earlier than at least one other opening which exhibits relatively high susceptibility to the adhesion of fuel.

Embodiments of the internal combustion engine are advantageous in which at least one opening is arranged on a free end of the closure body situated in the rest position, wherein the free end faces toward the combustion chamber of the cylinder. Said opening would then preferably constitute an opening which exhibits relatively high susceptibility to the adhesion of fuel and which is separated from the fuel supply system later than at least one other opening which exhibits relatively low susceptibility to the adhesion of fuel.

Embodiments of the internal combustion engine are advantageous in which the injection device is an injection nozzle.

In this context, embodiments are advantageous in which the injection nozzle is equipped with a nozzle needle which is displaceable in the direction of a longitudinal axis in a nozzle needle guide, which nozzle needle, during the course of an injection, connects at least two nozzle holes, which function as openings, to the fuel supply system for the purposes of introducing fuel, and thus opens up said nozzle holes.

Here, embodiments of the internal combustion engine are advantageous in which the closure body is arranged on a free end of the nozzle needle, wherein the free end of the nozzle needle is the combustion-chamber-side end.

If the injection device is an injection nozzle, embodiments of the internal combustion engine are advantageous in which the injection nozzle is equipped with a spherical closure body.

If the injection device is an injection nozzle, embodiments of the internal combustion engine may also be advantageous in which the injection nozzle is equipped with a crowned closure body.

Embodiments of the internal combustion engine are advantageous in which the movable closure body is of symmetrical form. The symmetry may be a symmetry with respect to the displacement travel of the closure body, or else the closure body is rotationally symmetrical, for example is a ball or is spherical.

Embodiments of the internal combustion engine may also be advantageous in which the movable closure body is of asymmetrical form.

Embodiments of the internal combustion engine are advantageous in which each cylinder is equipped with an ignition device for the initiation of an applied ignition.

The present disclosure will be described in more detail below with reference to FIGS. 1-4.

FIG. 1 depicts an example of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto (which may be referred to herein as injection devices or injection nozzles). As a non-limiting example, cylinder 14 is shown including two fuel injectors 166 and 170. Fuel injectors 166 and 170 may be configured to deliver fuel received from fuel system 8. As elaborated with reference to FIGS. 2 and 3, fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below.

The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature. The controller 12 receives signals from the various sensors of FIG. 1 and employs the various actuators of FIG. 1 to adjust engine operation based on the received signals and instructions stored on a memory of the controller.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Figure 2:
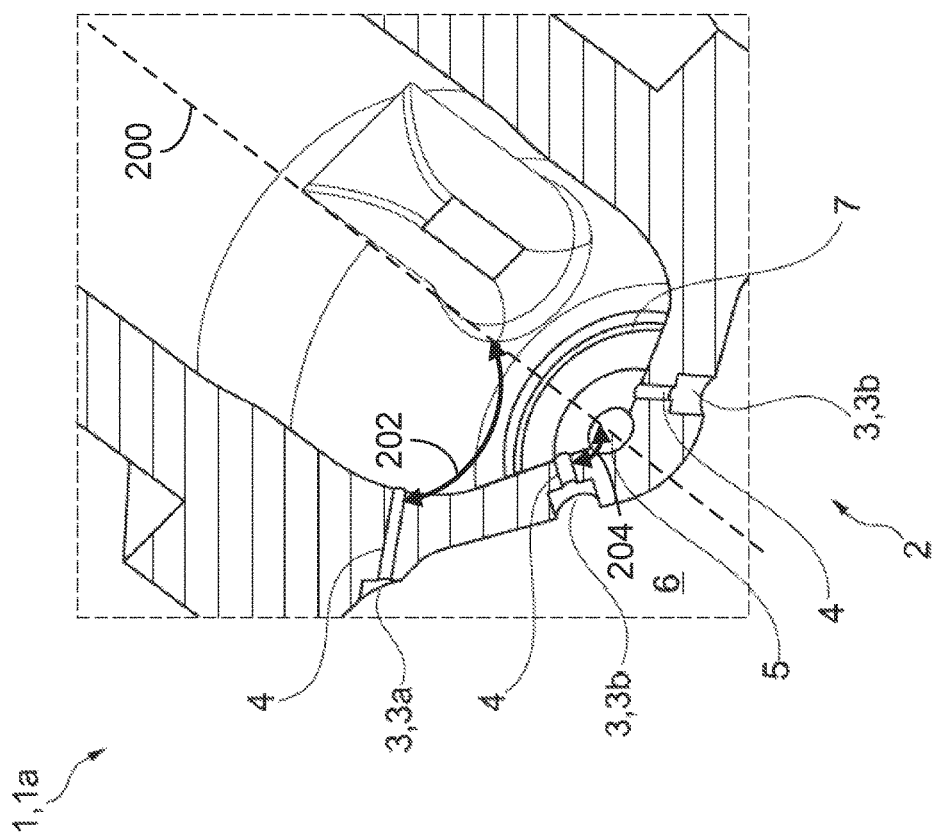
FIG. 2 shows a cross-sectional view of a fragment of a housing of an injection nozzle of an injection device.

The injection nozzle 1a (e.g., fuel injector) illustrated in FIG. 2 is a multi-hole nozzle, in which multiple openings 3 are provided. On the free end 2 of the nozzle 1a, that is to say on the nozzle tip 2, there is arranged a blind hole 5 and multiple nozzle holes 3, 3b which are supplied with fuel via ducts 4. Here, the ducts 4 open into the combustion chamber of the cylinder 6 so as to form the nozzle holes 3, 3b, wherein the fuel emerges from the nozzle holes 3b during the course of an injection.

Figure 3:
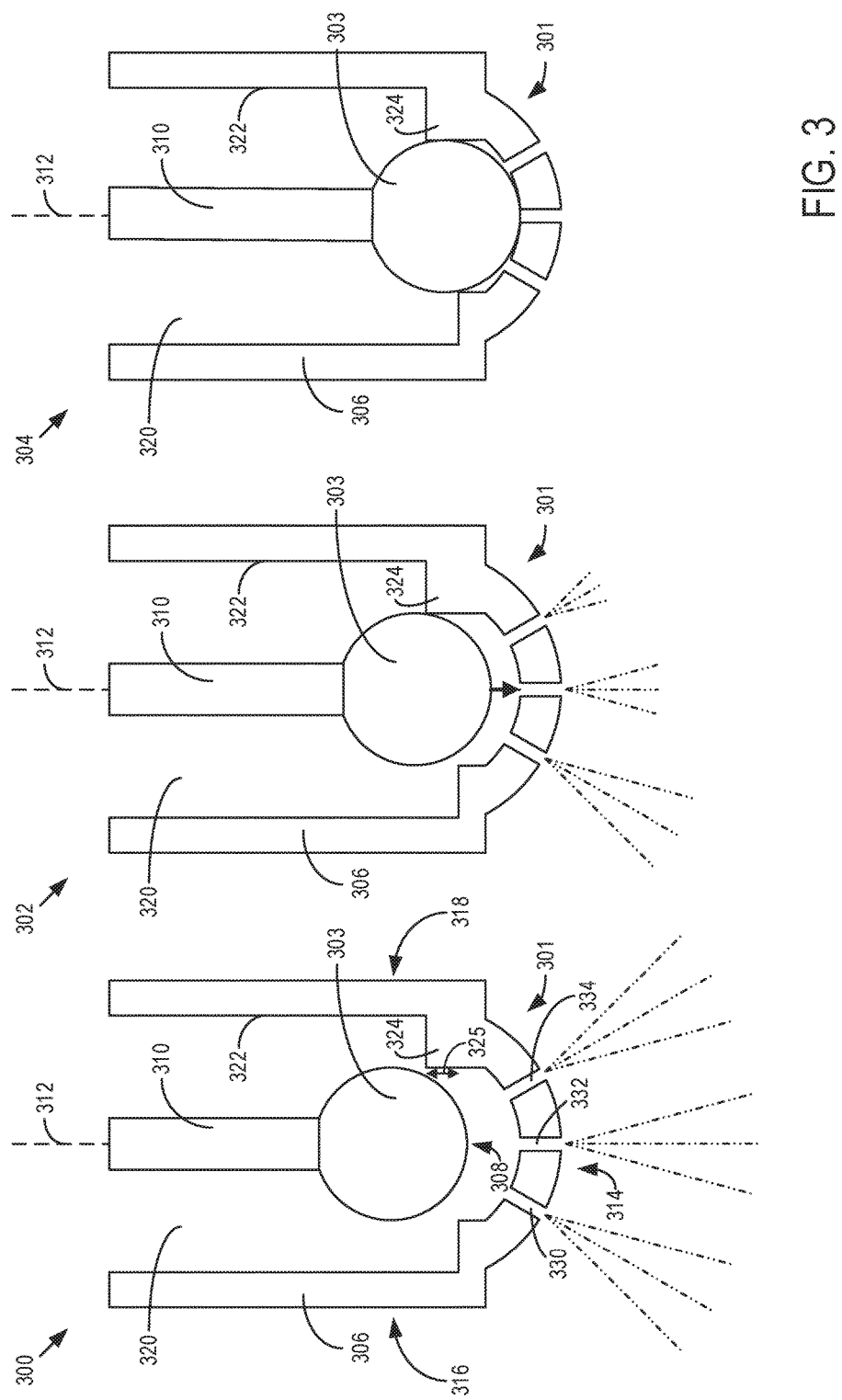
FIG. 3 schematically shows views of a first embodiment of an injection device including a moveable closure body in three different positions.
Figure 4:
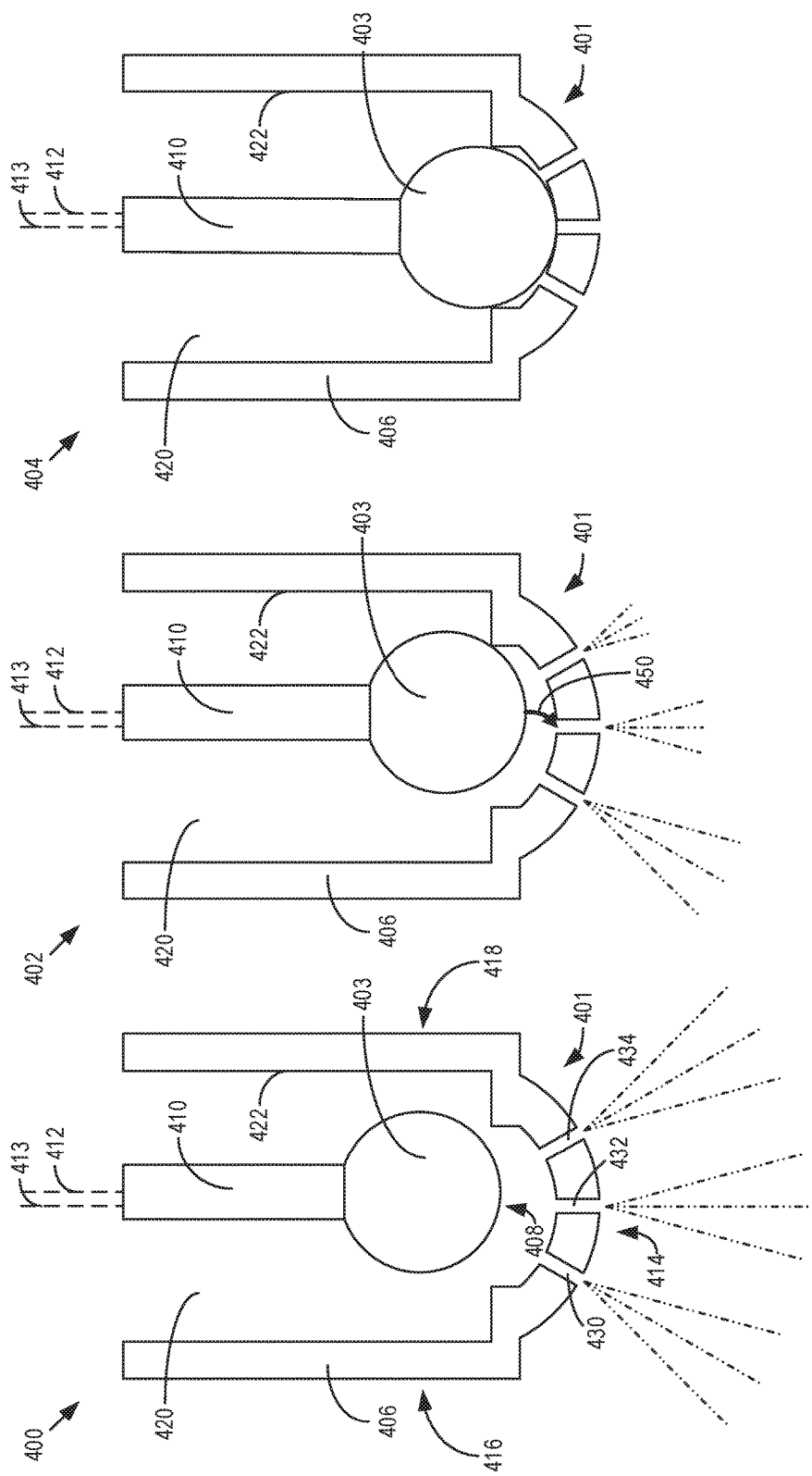
FIG. 4 schematically shows views of a second embodiment of an injection device including a moveable closure body in three different positions.

In the present case, one opening 3, 3a is arranged on an outer circumference of the closure body (an example of which is shown by FIGS. 3-4), which is displaceable in translational fashion and situated in the rest position. In the rest position, the closure body rests along a linear seal 7 in the nozzle tip 2 and separates the openings 3, 3a, 3b from a fuel supply system of the internal combustion engine, whereby the openings 3, 3a, 3b are deactivated with regard to the introduction of fuel.

To end the injection process, the openings 3, 3a, 3b of the injection nozzle 1a are separated from the fuel supply system not simultaneously but in succession with a time offset. Here, those openings 3, 3a which exhibit relatively low susceptibility to the adhesion of fuel are separated from the fuel supply system first.

In the present case, the nozzle hole 3, 3a arranged on the outer circumference of the closure body forms a relatively small angle 204 with an axis 200 of the prevailing gravitational acceleration g (e.g., a direction of gravity relative to an installed position of the injection nozzle within the engine), for which reason said nozzle hole 3, 3a exhibits relatively low susceptibility to the adhesion of fuel and is separated from the fuel supply system earlier than the other nozzle holes 3, 3b which are arranged on the nozzle tip 2 and which, in the installed position of the internal combustion engine, form a relatively large angle 202 with the axis 200 of the prevailing gravitational acceleration.

FIG. 3 shows a first view 300, a second view 302, and a third view 304 of a fuel injector 301 which may be included within an engine such as the engine shown by FIG. 1. A moveable closure body 303 is positioned at an end 308 (e.g., free end) of a needle 310 (e.g., nozzle needle) within a housing 306 (e.g., body) of the fuel injector. First view 300 shows the needle in a retracted position (e.g., working position), second view 302 shows the needle in a first extended position, and third view 304 shows the needle in a second extended position (e.g., rest position). A fuel passage 320 surrounds an exterior of the needle and receives fuel from a fuel system (e.g., the fuel system described above with reference to FIG. 1).

A plurality of injection holes are formed at a distal end 314 of the fuel injector. For example, the fuel injector is shown to include a first injection hole 330, a second injection hole 332, and a third injection hole 334. The first injection hole 330 is positioned at a first side 316 of the housing and the third injection hole 334 is positioned at a second side 318 of the housing. In the retracted position shown by the first view 300, fuel flows from each of the injection holes at a relatively same rate. However, in the first extended position shown by the second view 302, the moveable closure body 303 presses against a protrusion 324 formed by an inner surface 322 of the fuel injector at the second side 318 of the housing. As a result, fuel flow around the needle at the second side is decreased relative to fuel flow around the needle at the first side. This effectively separates the third injection hole 334 from the fuel supply earlier than the third injection hole 330 and second injection hole 332 (e.g., creates a time offset between fully connecting and fully separating the third injection hole from the fuel flow relative to fully connecting and fully separating the first injection hole from the fuel flow). In the example shown by FIG. 3, the needle moves along a central axis 312 (e.g., longitudinal axis) of the fuel injector. The protrusion 324 extends in the direction of the central axis for a length 325, away from the plurality of injection holes. In some examples, the fuel injector may include a plurality of protrusions similar to the protrusion 324, with each protrusion positioned around a perimeter of the inner surface 322.

FIG. 4 shows a second embodiment of a fuel injector 401 in a first view 400, a second view 402, and a third view 404. Similar to the example described above with reference to FIG. 3, the first view 400 shows a needle 410 and closure body 403 of the fuel injector in a retracted position, second view 402 shows the needle 410 and closure body 403 in a first extended position, and third view 404 shows the needle 410 and closure body 403 in a second extended position. The fuel injector includes a housing 406, distal end 414, first side 416, second side 418, fuel passage 420, central axis 413, and a plurality of injection holes (e.g., first injection hole 430, second injection hole 432, and third injection hole 434), similar to the housing 306, distal end 314, first side 316, second side 318, fuel passage 320, central axis 312, and plurality of injection holes shown by FIG. 3 and described above. However, the fuel injector 401 shown by FIG. 4 does not include an extended protrusion formed by an inner surface 422 as with the example shown by FIG. 3 and described above. Instead, in order to produce a time offset (e.g., delay) between a closing of the third injection hole 434 relative to the first injection hole 430 and second injection hole 432 as the needle is moved from the retracted position to the first and second extended positions, a needle central axis 412 is offset from the fuel injector central axis 413 in a radial direction relative to the fuel injector central axis 413. By configuring the needle in this way, an end 408 of the needle (e.g., the end including the movable closure body 403) presses against the inner surface 422 of the fuel injector when the needle is moved from the retracted position to the first extended position. As the needle is further pressed against the inner surface 422, the needle and movable closure body move in an arcing direction 450 toward the second extended position. In some examples, the inner surface may be chamfered, beveled, or otherwise shaped to enable a smooth movement of the needle and closure body toward the distal end of the fuel injector. Moving the needle and closure body in the arcing direction separates the third injection hole 434 from the fuel passage 420 earlier than the first injection hole 430 and second injection hole 432, thereby decreasing a flow rate of fuel from the third injection hole 434 relative to flow rates from the other injection holes. By reducing the flow rate of fuel from the third injection hole earlier than the other injection holes, an amount of fuel injector wetting (e.g., fuel accumulation at the distal end of the fuel injector) may be reduced after injecting fuel into an engine cylinder. Reducing wetting may subsequently reduce an amount of deposits formed at the injection holes and may reduce particulate emissions from the engine.

In one embodiment, a method for operating an applied-ignition, direct-injection internal combustion engine having at least one cylinder, in which each cylinder is, for the direct introduction of fuel into the cylinder, equipped with an injection device which has a movable closure body includes: by positive control, during the course of an injection, connecting at least two openings provided in a housing of the injection device to a fuel supply system for the purposes of introducing fuel into the cylinder, and thus opening up the at least two openings by moving the movable closure body from a rest position in which the at least two openings are separated and blocked from the fuel supply system to a working position connecting the at least two openings to the fuel supply system; and proceeding from the working position in which the at least two openings are connected to the fuel supply system, moving the closure body from the working position into the rest position, with the at least two openings of the injection device being separated from the fuel supply system in succession with a time offset in such a way that at least one opening of the at least two openings is already fully separated from the fuel supply system while at least one other opening of the at least two openings is still connected to the fuel supply system. In a first example of the method, proceeding from the working position and moving the closure body into the rest position includes forming a relatively large angle between the at least one opening separated from the fuel supply system later than the at least one other opening and a prevailing gravitational acceleration, and forming a relatively small angle between the at least one other opening and the prevailing gravitational acceleration.

In one embodiment, a fuel injector includes: a housing including a nozzle tip and a seating surface formed within the nozzle tip;

a plurality of injection holes formed by the nozzle tip; and a needle housed within the housing, the needle moveable to a first extended position in which the needle directly contacts the seating surface at a first side of the housing and does not directly contact the seating surface at a second side of the housing. In a first example of the fuel injector, the needle is moveable to a first retracted position in which the needle does not contact the seating surface. A second example of the fuel injector optionally includes the first example, and further includes wherein the needle is moveable to a second extended position in which the needle directly contacts the seating surface at both the first side and the second side of the housing, and wherein the first extended position is between the second extended position and the first retracted position. A third example of the fuel injector optionally includes one or both of the first and second examples, and further includes wherein the needle is moveable in a direction of a central axis of the fuel injector between each of the first retracted position, first extended position, and second extended position. A fourth example of the fuel injector optionally includes one or more or each of the first through third examples, and further includes wherein the needle is moveable in an arcing direction relative to a central axis of the fuel injector between the first extended position and the second extended position. A fifth example of the fuel injector optionally includes one or more or each of the first through fourth examples, and further includes wherein the needle is moveable in a direction of the central axis between the first extended position and the first retracted position. A sixth example of the fuel injector optionally includes one or more or each of the first through fifth examples, and further includes wherein the plurality of injection holes includes a first injection hole positioned toward the first side and a second injection hole positioned toward the second side, and wherein a fuel flow from the first injection hole is less than a fuel flow from the second injection hole with the needle in the first extended position. A seventh example of the fuel injector optionally includes one or more or each of the first through sixth examples, and further includes wherein the plurality of holes is positioned at a distal end of the nozzle tip downstream of the seating surface, and wherein the seating surface at the first side of the housing extends further away from the plurality of holes than the seating surface at the second side of the housing.

In another embodiment, a fuel injector includes: a body forming a nozzle tip; a fuel passage positioned within the body, the fuel passage fluidly coupled to a plurality of injection holes formed at the nozzle tip; and a needle positioned within an interior of the body and upstream of the plurality of injection holes, the needle including an end shaped to press against an inner surface of the body to allow fuel to flow along the inner surface at a first side of the needle and to not allow fuel to flow along the inner surface at a second side of the needle. In a first example of the fuel injector, the end of the needle has an approximately spherical shape. A second example of the fuel injector optionally includes the first example, and further includes wherein the inner surface of the body includes a first protrusion (e.g., nozzle needle guide) shaped to directly contact the end of the needle at the second side. A third example of the fuel injector optionally includes one or both of the first and second examples, and further includes wherein the first protrusion extends away from the nozzle tip in a direction of a central axis of the fuel injector. A fourth example of the fuel injector optionally includes one or more or each of the first through third examples, and further includes wherein the first protrusion does not directly contact the end of the needle at the first side. A fifth example of the fuel injector optionally includes one or more or each of the first through fourth examples, and further includes wherein the first protrusion is one of a plurality of protrusions, and wherein each protrusion of the plurality of protrusions extends away from the nozzle tip in the direction of the central axis. A sixth example of the fuel injector optionally includes one or more or each of the first through fifth examples, and further includes wherein each protrusion of the plurality of protrusions extends inward toward the central axis by a same amount. A seventh example of the fuel injector optionally includes one or more or each of the first through sixth examples, and further includes wherein the first protrusion extends away from the nozzle tip by a greater amount than each other protrusion of the plurality of protrusions. An eighth example of the fuel injector optionally includes one or more or each of the first through seventh examples, and further includes wherein the plurality of protrusions is positioned upstream of the injection holes, and wherein the end of the needle presses against a sealing line positioned upstream of the injection holes and downstream of the plurality of protrusions. A ninth example of the fuel injector optionally includes one or more or each of the first through eighth examples, and further includes wherein the sealing line is formed by the inner surface, and wherein a midpoint of the sealing line is offset a distance from a central axis of the needle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an applied-ignition, direct-injection internal combustion engine having at least one cylinder, in which each cylinder is, for the direct introduction of fuel into the cylinder, equipped with an injection device which has a moveable closure body, the method comprising:
   connecting at least two openings provided in a housing of the injection device to a fuel supply system by moving the moveable closure body from a rest position in which the at least two openings are separated from the fuel supply system to a working position connecting the at least two openings to the fuel supply system; and
   proceeding from the working position in which the at least two openings are connected to the fuel supply system, moving the closure body from the working position into the rest position, with the at least two openings of the injection device being separated from the fuel supply system in succession with a time offset in such a way that at least one opening of the at least two openings is already fully separated from the fuel supply system while at least one other opening of the at least two openings is still connected to the fuel supply system, the opening fully separated from the fuel supply system later in time having a greater angle relative to a direction of gravity than another opening.

2. A fuel injector comprising:
   a housing including a nozzle tip and a seating surface formed within the nozzle tip;
   a plurality of injection holes formed by the nozzle tip; and
   a needle housed within the housing, the needle moveable to a first extended position and a first retracted position, the first extended position in which the needle directly contacts the seating surface at a first side of the housing and does not directly contact the seating surface at a second side of the housing and the first retracted position in which the needle does not contact the seating surface.

3. The fuel injector of claim 2, wherein the needle is moveable to a second extended position in which the needle directly contacts the seating surface at both the first side and the second side of the housing, and wherein the first extended position is between the second extended position and the first retracted position.

4. The fuel injector of claim 3, wherein the needle is moveable in a direction of a central axis of the fuel injector between each of the first retracted position, the first extended position, and the second extended position.

5. The fuel injector of claim 3, wherein the needle is moveable in an arcing direction relative to a central axis of the fuel injector between the first extended position and the second extended position.

6. The fuel injector of claim 5, wherein the needle is moveable in a direction of the central axis between the first extended position and the first retracted position.

7. The fuel injector of claim 2, wherein the plurality of injection holes includes a first injection hole positioned toward the first side and a second injection hole positioned toward the second side, and wherein a fuel flow from the first injection hole is less than a fuel flow from the second injection hole with the needle in the first extended position.

8. The fuel injector of claim 2, wherein the plurality of holes is positioned at a distal end of the nozzle tip downstream of the seating surface, and wherein the seating surface at the first side of the housing extends further away from the plurality of holes than the seating surface at the second side of the housing.

9. A fuel injector comprising:
   a body forming a nozzle tip;
   a fuel passage positioned within the body, the fuel passage fluidly coupled to a plurality of injection holes formed at the nozzle tip; and
   a needle moveable within an interior of the body and upstream of the plurality of injection holes, a first position of the needle including an end shaped to press against an inner surface of the body to allow fuel to flow along the inner surface at a first side of the needle and to not allow fuel to flow along the inner surface at a second side of the needle, a second position of the needle allowing fuel to flow along the inner surface of the first and second sides, the fuel flow in the first position being greater in a first injection hole than a second injection hole.

10. The fuel injector of claim 9, wherein the end of the needle has an approximately spherical shape.

11. The fuel injector of claim 9, wherein the inner surface of the body includes a first protrusion shaped to directly contact the end of the needle at the second side.

12. The fuel injector of claim 11, wherein the first protrusion extends away from the nozzle tip in a direction of a central axis of the fuel injector.

13. The fuel injector of claim 11, wherein the first protrusion does not directly contact the end of the needle at the first side.

14. The fuel injector of claim 11, wherein the first protrusion is one of a plurality of protrusions, and wherein each protrusion of the plurality of protrusions extends away from the nozzle tip in a direction of a central axis of the fuel injector.

15. The fuel injector of claim 14, wherein each protrusion of the plurality of protrusions extends inward toward the central axis by a same amount.

16. The fuel injector of claim 14, wherein the first protrusion extends away from the nozzle tip by a greater amount than each other protrusion of the plurality of protrusions.

17. The fuel injector of claim 16, wherein the plurality of protrusions is positioned upstream of the plurality of injection holes, and wherein the end of the needle presses against a sealing line positioned upstream of the plurality of injection holes and downstream of the plurality of protrusions.

18. The fuel injector of claim 17, wherein the sealing line is formed by the inner surface, and wherein a midpoint of the sealing line is offset a distance from a central axis of the needle.

* * * * *